United States Patent [19]

Yamada et al.

[11] Patent Number: 4,894,814
[45] Date of Patent: Jan. 16, 1990

[54] OPTICAL DISC PLAYER WITH PAUSE FUNCTION IN RESPONSE TO ELAPSED PRESET MAXIMUM PLAYBACK TIME PERIOD

[75] Inventors: Jiro Yamada, Neyagawa; Susumu Kinoshita, Katano; Haruhisa Tomoda, Neyagawa, all of Japan

[73] Assignee: Matsushita Electric Industrial Co., Ltd., Kadoma, Japan

[21] Appl. No.: 52,331

[22] Filed: May 21, 1987

[30] Foreign Application Priority Data

May 23, 1986 [JP] Japan .................. 61-119741

[51] Int. Cl.⁴ ............................ G11B 7/085
[52] U.S. Cl. ...................... 369/19; 369/30; 369/32; 358/342
[58] Field of Search .............. 369/19, 20, 24, 30, 369/32, 33, 54; 358/342

[56] References Cited

U.S. PATENT DOCUMENTS

| 4,193,120 | 3/1980 | Yello | 369/19 X |
| 4,600,948 | 7/1986 | Dangschat | 358/190 |
| 4,626,106 | 12/1986 | Hooper | 369/19 X |
| 4,667,314 | 5/1987 | Iwashima | 369/32 |
| 4,701,898 | 10/1987 | Giddings | 369/32 |

FOREIGN PATENT DOCUMENTS

| 1171172 | 7/1984 | Canada. |
| 0169597 | 1/1986 | European Pat. Off.. |
| 3231581 | 3/1983 | Fed. Rep. of Germany. |
| 2509508 | 1/1983 | France. |

OTHER PUBLICATIONS

Patent Abstracts of Japan, vol. 10, No. 260 (P-494) [2316], 5th Sep. 1986, JP 61085674(1); Rotary Magnetic Recording and Reproducing Device.
Hart, Glenn A., "NEC's CD-705E: Fully Loaded and Less Expensive", Digital Audio, 2/85, p. 44, 47.
Montgomery Ward, Color Television Model 12865 manual, 1985.

Primary Examiner—Robert L. Richardson
Assistant Examiner—W. R. Young
Attorney, Agent, or Firm—Cushman, Darby & Cushman

[57] ABSTRACT

An optical disc player having a timer for counting the elapse of time from the start of reproduction of music on an optical disc, an input for entering a desired reproduction time, a memory for storing the desired reproduction time and a logic processor for comparing the passage of time counted by the timer. The disc player pauses without going back to the starting position the reproduction of music when the elapsed time coincides with the desired reproduction time.

4 Claims, 6 Drawing Sheets

OPTICAL DISC PLAYER WITH PAUSE FUNCTION IN RESPONSE TO ELAPSED PRESET MAXIMUM PLAYBACK TIME PERIOD

FIELD OF THE INVENTION AND RELATED ART STATEMENT

1. Field Of The Invention

The present invention relates to an optical disc player such as a compact disc player or the like, and more particularly relates to an optical disc player having a timer for controlling the reproduction time of music stored on an optical disc.

2. Description Of The Related Art

A conventional optical disc player is described as follows with reference to FIG. 6. FIG. 6 is a block diagram showing the schematic construction of a conventional optical device player. The disc player comprises an input unit 1, a logic processing unit 2, a memory unit 3 and a disc reproducing unit 4. Within the disc player, input unit 1 comprises, for example, a plurality of key switches for entering a number representing the position of a selected piece of music on an optical disc to the logic processing unit 2. By use of the keyboard, a user enters numbers corresponding to the positions of the music which he wishes to reproduce (listen to) in a desired order. The logic processing unit 2 is, for example, a microprocessor and it transmits input signals from the input unit 1 to the memory unit 3 for storage and later read out. The memory unit 3 consists of, for example, read only memories for storing an operation program and random access memories for storing data and the input signals from the input unit 1. The disc reproducing unit 4 controls the position of a pick-up device on the disc for orderly reproducing data such as music requested from the memory unit 3.

For operation, the user first enters code numbers corresponding to the positions of the music which he wants to listen into the logic processing unit 2 through the keyboard of the input unit 1, whereby the numbers of the position of the music are orderly stored in the memory unit 3. Next, the logic processing unit 2 orderly reads out from the memory unit 3 a datum, which corresponds to a number of the position of a musical selection on the disc in the order of storing, and issues a signal corresponding to that number to the disc reproducing unit 4, and the disc reproducing unit 4 controls the position of the pick-up device to reproduce (play) the musical selection on the optical disc. By repeating the above-mentioned operation, the musical selections, which are stored in the memory unit 3, are serially reproduced.

In the conventional optical disc player, however, since it does not have a special timer unit for controlling the automatic stopping or the pausing operation of the optical disc player, the user cannot designate the time to stop the reproduction of the optical disc. When the user wants to stop, pause or finish the reproduction after the passage of 30 or 45 minutes from the start, he must start to count the time elapsed from the start of the reproduction, and then stop, pause or finish the reproducing operating of the optical disc player after elapse of 30 minutes or 45 minutes.

OBJECT AND SUMMARY OF THE INVENTION

The object of the present invention is to provide an optical disc player having a timer for automatically stopping, pausing or finishing the reproduction of music stored on an optical disc.

An optical disc player in accordance with the present invention comprises an input unit for entering a desired reproduction time during which music on an optical disc is to be reproduced. A memory unit stores data corresponding to the desired user selected reproduction time. A disc play-back unit controls the position of a pick-up device for reproduction of the music on the disc. A timer unit counts the time elapsed from the start of the reproduction of the optical disc. A logic processing unit compares the desired reproduction time stored in the memory unit with the time counted by the timer unit, and issues a control signal to the disc reproduction unit for stopping the reproduction of the optical disc when the elapsed time coincides with the desired reproduction time.

DESCRIPTION OF THE PREFERRED EMBODIMENT

A preferred embodiment of an optical disc player in accordance with the present invention is described as follows with reference to FIG. 1, FIG. 2 and FIG. 5.

Figure 1:
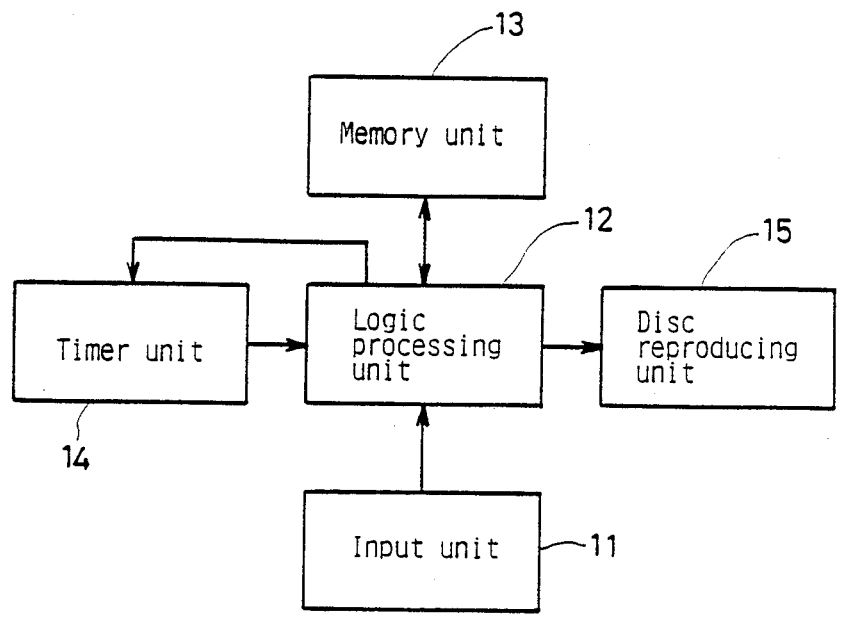
FIG. 1 is a block diagram showing a schematic construction of a preferred embodiment of an optical disc player in accordance with the present invention.
Figure 5:
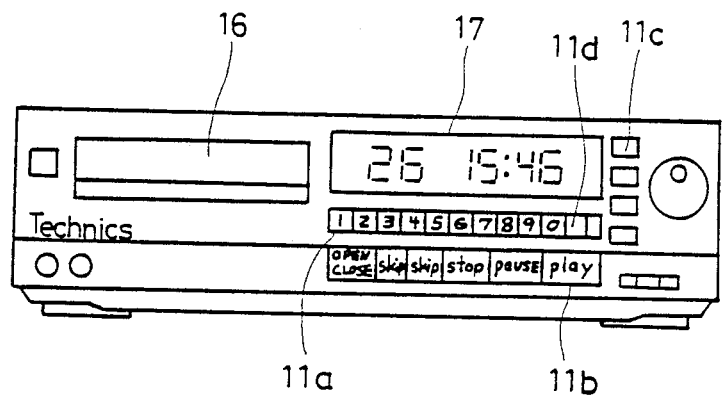
FIG. 5 is a front view of the optical disc player shown in FIG. 1 and FIG. 3.
Figure 6:
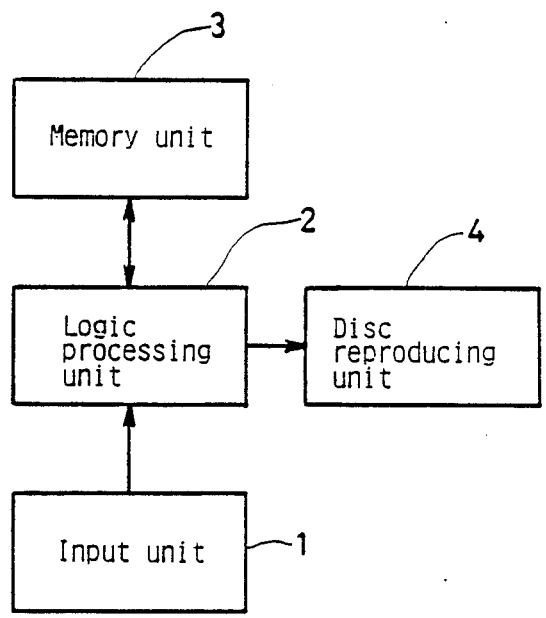
FIG. 6 is a block diagram showing the schematic construction of a conventional optical disc player.

FIG. 1 is a block diagram showing a schematic construction of an optical disc player in accordance with the present invention, and FIG. 5 shows, as an example, a front view of the optical disc player of FIG. 1. In FIG. 1, the optical disc player comprises an input unit 11, a logic processing unit 12, a memory unit 13, a timer unit 14 and a disc reproducing unit 15. The input unit 11 is constructed of, for example, a plurality of numeral keys 11a, a starting switch 11b, plural timer mode selecting switch 11c, a memory switch 11d and the like, which are shown in FIG. 5. The input unit 11 is for entering data, such as an optional desired reproduction time during which a user wishes to reproduce (listen to) music, and to enter a start signal by which the optical disc player starts to reproduce the music stored on the optical disc. The processing unit 12 receives the data from the input unit 11 and transmits it to the memory unit 13, reads out the data from the memory unit 13 and issues control signals to the timer unit 14 and to the disc reproducing unit 15. The memory unit 13 stores the data corresponding to the optional desired reproduction time and the other data from the input unit 11. The timer unit 14 starts to count the time elapsed from the start of the reproduction of the optical disc at the time of receiving the start signal from the starting switch 11b, and issues counter data to the logic processing unit 12 continuously. The disc reproducing unit 15 controls the position of a pick-up device which reads out the digital data stored on the optical disc by irradiating laser light on a surface of the optical disc and receiving the reflected light from the surface through control signals from the logic processing unit 12.

Figure 2:
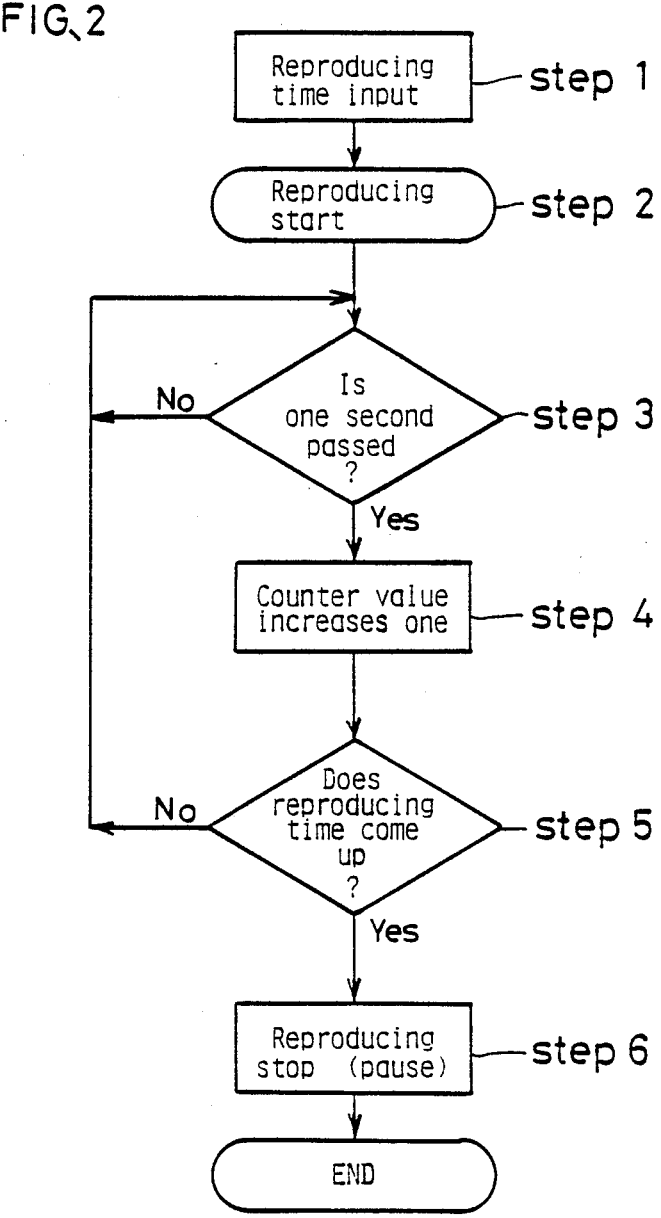
FIG. 2 is a flow chart showing the operation of the optical disc player shown in FIG. 1.

FIG. 2 is a flow chart showing the operation of the above-mentioned optical disc player of FIG. 1. In step 1, the reproduction time is set (for example, as 30 minutes) by use of the input unit 11. A detailed description is that, after setting the optical disc on a disc tray 16 and pushing one of the timer mode selecting switches 11c so as to make the logic processing unit 12 receive a datum corresponding to the reproduction time, the reproduction time is entered by using the numeral keys 11a. By such operation, the reproduction time set by the input unit 11 is stored in the memory unit 13 via transmission of signals from the logic processing unit 12. In step 2, the optical disc player starts to reproduce the disc when the starting switch 11b of the input unit 11 is pushed, and the timer unit 14 starts to count the time elapsed. Steps 3 and 4 show the time counting operation of the timer unit 14. The counter value increases by one at every second. It is desirable to make the counting time period short. Step 5 shows a comparison operation in the logic processing unit 12. In this step, the counter value is compared with the data corresponding to the reproduction time stored in the memory unit 13, and the counting operation in steps 3 and 4 are repeated until the counter value coincides with the data of the reproduction time; and then, when the counter value coincides with the data of the reproduction time, the operation moves to step 6 and the reproduction of the optical disc player is stopped. The stopping of the reproduction in step 6 may be, for example, a pausing operation as shown in FIG. 2. A pause holds the pick-up device at a stopped position of reproduction. Alternatively, a stop may be for returning the pick-up device to the start position or for the finishing of the whole operation prior to cutting off the electric power.

Generally, the reproduction of an optical disc is performed in the order of the storage of music on the optical disc. However, when the user does not wish to listen to the music in the order of its storage, he can change the order of the play-back by first, pushing another timer mode selecting switch 11c in step 1 of FIG. 2, thereby changing the reproduction mode of the optical disc player, and second, by storing at least one number of the position of a music which he wishes to listen. The number of the position of a musical selection to which he wishes to listen to first is set by using the numeral keys 11a, and by further pushing the memory switch 11d the number is stored in the memory unit 13. By repeating the above-mentioned steps of operation, a plurality of numbers in a selected order representing the positions of the musical program are stored in the memory unit 13. Then, by pushing the start switch 11b in the step 2 of FIG. 2, the optical disc player starts to reproduce the musical programs in the stored order until the reproduction time period is over. In the above-mentioned optical disc player, when the reproduction time is over, the reproduction of the music instantaneously stops regardless of the musical programs being on the over or not. If a short extension of time is permitted, it is possible to extend the reproduction time period until the end of the musical program which is being played. The optical disc, such as the compact disc, contains data representing a total reproduction time, a total number of the musical selections stored on the optical disc and the start positions of respective musical programs. Accordingly, by searching and picking out the start position of the music to be reproduced next, it is possible to stop the playing of the optical disc player when the pick-up device reaches the start position of the next musical selection.

Figure 3:
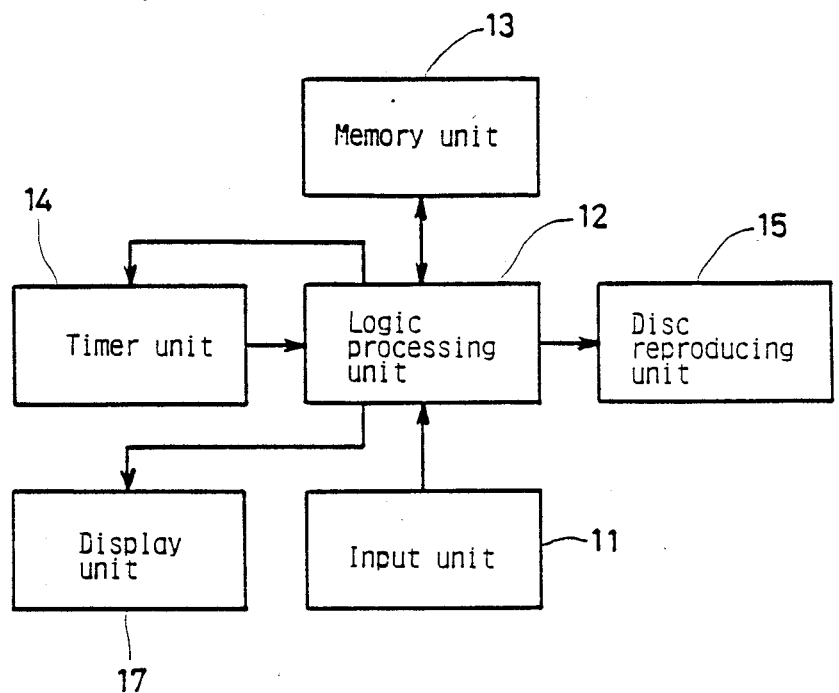
FIG. 3 is a block diagram showing a schematic construction of another preferred embodiment of an optical disc player in accordance with the present invention.
Figure 4:
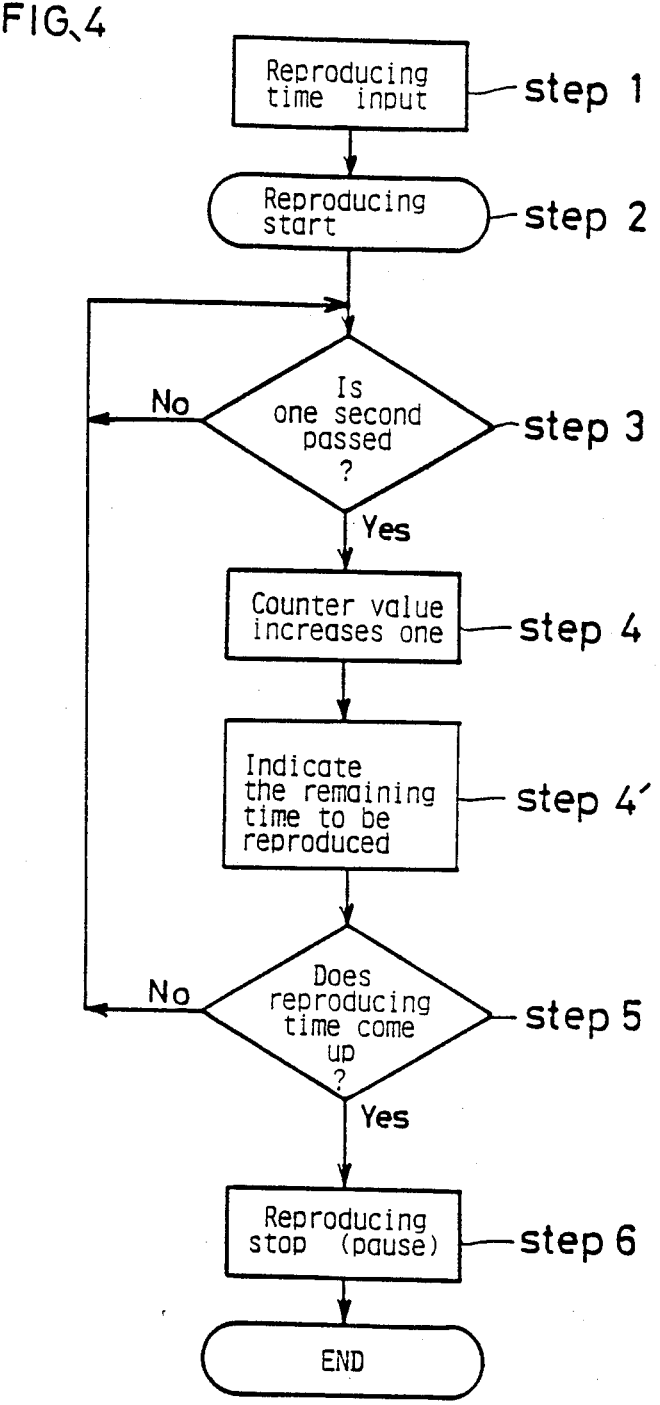
FIG. 4 is a flow chart showing the operation of the optical disc player shown in FIG. 3.

Another preferred embodiment of an optical disc player is described as follows with reference to FIG. 3, FIG. 4 and FIG. 5. Such embodiment of the optical disc player further comprises a display unit 17 in FIG. 3 and FIG. 5 in addition to the above mentioned embodiment shown in FIG. 1. In FIG. 4, the operation of the optical disc player comprises a step 4' for subtracting the counted value in the timer unit 14 from the reproduction time stored in the memory unit 13 and for indicating the subtracted value on the display unit 17. By using such subtracting and indicating functions, the optical disc player can indicate the remaining time in the reproduction time which was set by the user. It is generally known that the counter value can be directly indicated on the display unit 17 to indicate the passage of time from the start of the reproduction. When both the counter value and the subtracted value are displayed, the user can see the remaining time or the elapsed time at any moment.

As the optical disc player, in accordance with the present invention, reproduces the optical disc until the desired reproduction time set by the user comes to an end and stops, the disc player stops in a pause mode without movement of the pick-up device. By stopping in the pause mode, it is possible to continue the reproduction from the position where the pick-up device stayed even after stopping of the reproduction. As a result, all the data stored on the optical disc can be sharply reproduced without unpleasant omission of its end part.

In the case where the automatic stopping mode of the optical disc player is used for sleeping, namely the user goes to sleep while listening to music, the reproduction of the music is automatically finished when the desired reproduction time is over and power to the optical disc player automatically turns off, he can easily sleep without any abrupt stop of the music. In this case, it is desirable to lower the volume of the reproduction of the music gradually smaller as the elapsed time progresses.

Although the invention has been described in its preferred form with a certain degree of particularity, it is to be understood that the present disclosure of the preferred form can be changed in the details of construction and the combination and arrangement of parts may be rearranged without departing from the spirit and the scope of the invention as hereinafter claimed.

What is claimed is:

1. An optical disc player comprising:
    input means for entering a desired reproducing time period during which an optical disc is to be reproduced and a start signal by which reproduction of said optical disc is started;
    optical pick-up means for reading optical digital signals stored in said optical disc and for issuing electric digital signals corresponding to said optical digital signals;
    memory means for storing said desired reproducing time period;
    disc reproducing means for controlling the position of said optical pick-up means;
    timer means for counting elapsed time from the start of the reproduction of said optical disc at receipt of said start signal from said input means; and logic processing means for comparing said desired reproducing time period stored in said memory means with said elapsed time counted by said timer means, and for issuing a control signal to said disc reproducing means for stopping said optical pick-up means on a position where it is at in a pausing state when said elapsed time coincides with said desired reproducing time period; and said logic processing means includes causing restarting said disc reproducing means for controlling the position of said optical pick-up means from said position where said optical pick-up means is stopped when another start signal is entered by said input means.

2. An optical disc player comprising:

input means for entering numbers corresponding to the position of musical selections on an optical disc in a selected order to be reproduced, a desired reproducing time period during which said music is to be reproduced and a start signal by which reproduction of said optical disc is started;

optical pick-up means for reading optical digital signals stored in said optical disc and for issuing electric digital signals corresponding to said optical digital signals;

memory means for storing data corresponding to said numbers of the position of said musical selection, said selected order and said desired reproducing time period;

disc reproducing means for controlling the position of said optical pick-up means;

timer means for counting elapsed time from the start of the reproduction of said optical disc at receipt of said start signal from said input means; and logic processing means for comparing said desired reproducing time period stored in said memory means with said elapsed time counted by said timer means, and for issuing a control signal to said disc reproducing means for stopping said optical pick-up means on a position where it is at in a pausing state when said elapsed time coincides with said desired reproducing time period; and said logic processing means includes causing restarting said disc reproducing means for controlling the position of said optical pick-up means from said position where said optical pick-up means is stopped when another start signal is entered by said input means.

3. An optical disc player comprising:

input means for entering a desired reproducing time period during which an optical disc is to be reproduced and a start signal by which reproduction of said optical disc is started;

optical pick-up means for reading optical digital signals stored in said optical disc and for issuing electric digital signals corresponding to said optical digital signals;

memory means for storing said desired reproducing time period;

disc reproducing means for controlling the position of said optical pick-up means;

timer means for counting elapsed time from the start of the reproducing of said optical disc at receipt of said start signal from said input means;

display means for indicating time information due to the elapsed time count of said timer means; and logic processing means for comparing said desired reproducing time period stored in said memory means with said elapsed time counted by said timer means, and for issuing a control signal to said disc reproducing means for stopping said optical pick-up means on a position where it is at in a pausing state when said elapsed time coincides with said desired reproducing time period; and said logic processing means include causing restarting said disc reproducing means for controlling the position of said optical pick-up means from said position where said optical pick-up mean is stopped when another start signal is entered by said input means.

4. An optical disc player in accordance with claim 3, wherein said display means indicates a remaining time period which is said elapsed time subtracted from said desired reproducing time period by said logic processing means.

* * * * *